United States Patent [19]

Boyd

[11] 3,744,033

[45] July 3, 1973

[54] TEXT FORMATTING FOR DISPLAY

[75] Inventor: William Weller Boyd, Austin, Tex.

[73] Assignee: International Business Machines Corporation, Armonk, N.Y.

[22] Filed: Jan. 21, 1972

[21] Appl. No.: 219,798

[52] U.S. Cl. .............................................. 340/172.5
[51] Int. Cl. .............................................. G06f 3/14
[58] Field of Search .................................... 34/172.5

[56] References Cited

UNITED STATES PATENTS

| | | | |
|---|---|---|---|
| 3,501,746 | 3/1970 | Vosbury | 340/172.5 |
| 3,602,901 | 8/1971 | Jen | 340/172.5 |
| 3,299,408 | 1/1967 | Wang et al. | 340/172.5 |
| 3,289,176 | 11/1966 | Garth et al. | 340/172.5 |
| 3,241,120 | 3/1966 | Amdahl | 340/172.5 |
| 3,274,909 | 9/1966 | Haverbach | 340/172.5 |
| 3,248,705 | 4/1966 | Dammann et al. | 340/172.5 |

*Primary Examiner*—Paul J. Henon
*Assistant Examiner*—Mark Edward Nusbaum
*Attorney*—J. Jancin, Jr., Charles E. McTiernan and John L. Jackson

[57] ABSTRACT

A system in which a keyboard is used to enter codes into a bulk dynamic shift register which in turn selectively loads a smaller intermediate dynamic shift register which, upon command provides unformatted codes to be displayed to a formatting control system which formats the codes and loads them into a refresh or frame buffer. The frame buffer which is a random access memory outputs the formatted codes to an associated character generator and display. Complete formatting of the data to be displayed is accomplished during loading of the refresh buffer. No formatting is done between the refresh buffer and the character generator since the formatting performed prior to the loading of the characters in the refresh buffer is complete such that the data stored in the refresh buffer is identical to the data and format which would occur on printout if the unformatted characters from the intermediate dynamic shift register were input to a printer. During formatting an electronic tab stop is used, and the tab stop locations may be changed without the reentering of text characters. Further, during formatting, in the event that a format step cannot be completed prior to the output of another character from the intermediate shift register, the intermediate shift register is stopped to allow completion of the long format step. This situation usually occurs during a tab operation or a word underscore operation. If the long format operation can not be completed prior to the dying of the dynamic shift register, the shift register will be timed out and automatically rotated for another cycle to rejuvenate it.

5 Claims, 6 Drawing Figures

| | | | | | | | | | | | | | | | | |
|---|---|---|---|---|---|---|---|---|---|---|---|---|---|---|---|---|
| TAB RACK | | | | / | | | | / | | | | / | | | | / |
| | | | | | | | | | | | | | | | | |
| TAB | X | X | X | X | TABC | Sp | Sp | Sp | Y | Y | Y | Y | | | | |
| | | | | | | | | | | | | | | | | |
| OVERSTK | X | X | X | Y | Y | Y | Sp | Z | | | | | | | | |
| | | | | | | | | | | | | | | | | |
| USC | X | X | X | X | X | Sp | Y | Y | | | | | | | | |

| | | | | | | | | | | | | | | | | |
|---|---|---|---|---|---|---|---|---|---|---|---|---|---|---|---|---|
| TAB | X | X | X | X | TAB | Y | Y | Y | | | | | | | | |
| | | | | | | | | | | | | | | | | |
| OVERSTK | X | X | X | X | X | X | BS | BS | BS | Y | Y | Y | SP | Z | | |
| | | | | | | | | | | | | | | | | |
| USC | X | X | X | X | X | BS | BS | BS | US | US | US | SP | Y | Y | | |

TEXT FORMATTING FOR DISPLAY

CROSS REFERENCE TO RELATED APPLICATIONS

No Clock Shift Register and Control Technique, Randell James, therefor U. S. Pat. No. 3,675,216.

System for Arranging and Sharing Shift Register Memory, Royce D. Lindsey and Larry G. Smith, Ser. No. 214,370.

BACKGROUND OF THE INVENTION

1. Field of the Invention

This invention relates to display systems in general and more particularly to a display system in which data is originally keyed into a buffer and displayed for revision purposes and the codes representing the displayed data and printer control codes are either stored on magnetic media for later playout on a remote printer or played out on an associated on-line printer.

2. Description of the Prior Art

In the past in most display systems where formatting has been attempted the formatting occurred either totally or partially during transfer of data from the refresh buffer to the character generator. Due to the rapid refresh requirements of most displays this formatting was extremely difficult and resulted in either an incomplete formatting or a format operation requiring a number of steps such that the data as initially displayed was not properly formatted. Further, with the prior art systems, when the tab stops on the display where changed the data normally would have to be reentered into the system. Finally, with prior art systems, due to the time restraints which were occassioned by the formatting occurring during the transfer of data from the refresh buffer to the display generator, the displayed data usually did not take the form that the data would take upon playout on an associated printer. Thus an operator during revision did not have available on the display the data in the form or format that it would appear upon playout.

SUMMARY OF THE INVENTION

Briefly there is provided a system in which a keyboard is used to enter codes into a bulk dynamic shift register. This bulk dynamic shift register in turn selectively loads a smaller intermediate dynamic shift register which, upon command provides unformatted codes to be displayed to a formatting control system. The formatting control system formats the codes and loads them into a refresh or frame buffer. The frame buffer which is a random access memory outputs the formatted codes to an associated character generator and display. Complete formatting of the data to be displayed is accomplished during loading of the refresh buffer. No formatting is done between the refresh buffer and the character generator since the formatting performed prior to the loading of the characters in the refresh buffer is complete such that the data stored in the refresh buffer is identical to the data and format which would occur if the unformatted characters from the intermediate dynamic shift register were input to a printer. During formatting an electronic tab rack is used, and the tab stop locations may be changed without the reentering of text characters. Further, during formatting, in the event that a format step cannot be completed prior to the output of another character from the intermediate shift register, the intermediate shift register is stopped to allow completion of the long format step. This situation usually occurs during a tab operation or an underscoring operation. If the long format operation can not be completed prior to the dying of the dynamic shift register, the shift register will be timed out and automatically rotated for another cycle to rejuvenate it.

Characters from the intermediate dynamic shift register are decoded in the format control logic to determine whether a particular character is a print character, a tab character, a backspace character, a carrier return character or an underscore character. Then, based on this decode an automatic sequence is entered into to load the appropriate formatted characters into designated memory locations in the random access memory during alternate memory cycles by selectively counting up and counting down (for backspace) the memory address register and line register. Data is read out from the random access memory during alternate memory cycles by counting up the line counter once for each line to be displayed until a character from each line has been read out and then the memory address register is incremented and the line counter again cycled and the sequence repeated to provide a frame of data to be displayed.

DESCRIPTION OF THE PREFERRED EMBODIMENT

Figures 1, 2, 3:
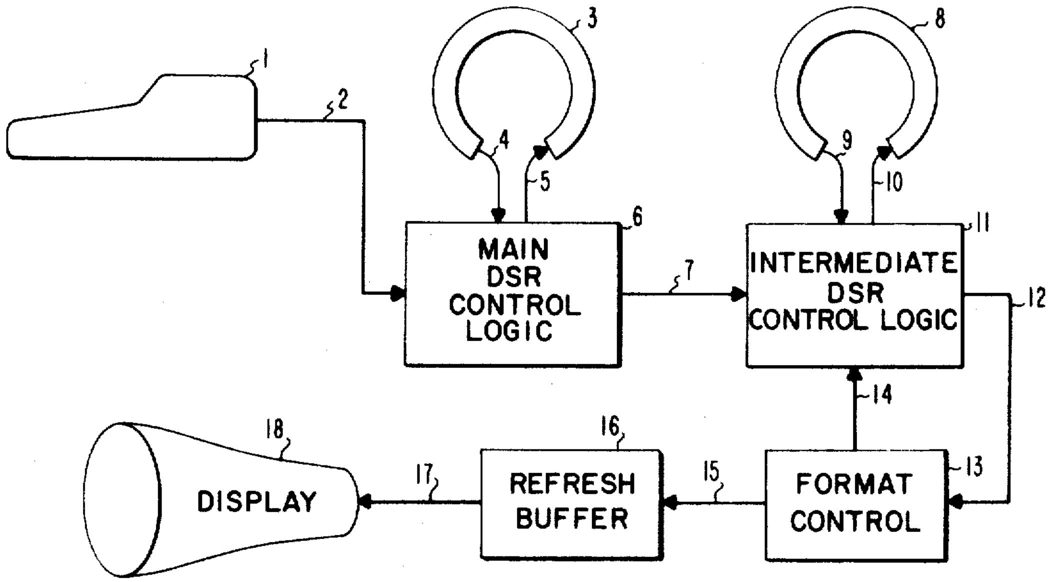
FIG. 1 is an overall block diagram illustrating the display system showing the main dynamic shift register, intermediate dynamic shift register, format control logic, refresh buffer and display along with a keyboard/printer.
FIG. 2 is a table illustrating the format of the text in the refresh buffer for a particular set of characters.
FIG. 3 is a table illustrating the format of the data as it appears in the intermediate dynamic shift register and main dynamic shift register to illustrate the conversion which must take place to provide the format of FIG. 2.

For a more detailed description of the invention, refer first to FIG. 1 which is an overall block diagram of the system. In FIG. 1 there is shown a keyboard/printer 1 in two way communication along line 2 with the main dynamic shift register control logic 6. Data from the dynamic shift register (DSR) 3 and data from the printer keyboard 1 is applied along line 5 to the DSR 3 and the data is then shifted out along line 4 to the main DSR control logic and then up again along line 5 into the main DSR 3. Upon demand data from the DSR 3 can be applied along line 7 to the intermediate DSR control logic 11 associated with the smaller DSR 8. Again with respect to the DSR 8 data flows from the control logic 11 along line 10 into the register and out of the register along lines 9 into the DSR control logic. A detailed description of the techniques employed in the control logic blocks 6 and 11 to alter the data paths of the data from their associated dynamic shift registers to delete characters, to advance characters and to otherwise manipulate the data will not be included. Reference, however, is made to copending application entitled No Clock Shift Register and Control Technique, U.S. Pat. No. 3,675,216 by Randall James assigned to the same assignee of the present invention, which contains a complete description of the operation of a DSR and the techniques for altering data within the register. Further refinements to the techniques described in U.S. Pat. No. 3,675,216 are described in the Lindsey and Smith application, System for Arranging and Sharing Shift Register Memory. The keyboard of FIG. 1 may be that shown in U. S. Pat. No. 3,457,368 to Houcke issued July 22, 1969, while the display may be that shown in U. S. Pat. No. 2,784,251 to Young et al. In particular, with respect to the Young patent, it should be noted that as discussed in Column 1, lines 59 through 62 that this type of display could be used on an ENIAC computer, thus implying that it can be driven directly by a binary type of system such as shown and described in applicant's specification. As is further shown in FIG. 1, data from the intermediate DSR control logic 11 also can be applied along line 12 to the format control 13. The format control 13 is also connected to the control logic 11 by means of line 14 to signal the dynamic shift register to quit outputting characters along line 12 when, as above discussed, a long formatting step is taking place such that the format control logic can not handle the stream of characters applied along line 12. Following the formatting in the format control 13 the formatted data is applied along line 15 to a refresh buffer 16, as will later be described in more detail. The refresh buffer 16 is a random access memory which an output characters along line 17 to display 18 at a rate sufficient to drive display 18. In the particular technique employed in the present invention five text lines are displayed by display 18. Thus, assuming a vertical sweep time of 25 microseconds (34.92 microseconds including retrace) the display buffer must be able to provide five characters to the display during this sweep time. In addition, there is a scale line and information (tick marks, numbers, tabstops, etc.) for it must also be supplied within this time. Obviously, then as above discussed, it would be extremely difficult to do any type of formatting between the display 18 and the refresh buffer 16 due to the time constraints imposed by the systems configuration.

Refer next to FIG. 2 which illustrates the format of the data as it appears in the refresh buffer. It will be noted that the format of the data is exactly as it would appear on a printed page. The format control logic to accomplish this formatting will be later described in connection with FIGS. 4*a*, 4*b* and the timing diagrams of FIG. 5.

In FIG. 2, there is illustrated a tab rack. This is a portion of memory and, as shown, there is a marker in every fourth memory location. These are electronic tab stops and in memory are merely assigned bits in the data word which are turned on in the event that a tab stop is set by the operator. Assuming that the tab stops are set as shown in FIG. 2, if there is a data flow along line 12 into the format control 13 from the intermediate DSR 8 in the sequence labeled tab in FIG. 3, the tab format of FIG. 2 will result. Thus as illustrated, the tab control sequence is to enter characters, always checking for a tab code in the data flow, and when a tab code is detected a space is then entered and the tab rack is checked for a marker indicating a tab stop. If none is detected another space is entered and the sequence is continued until, as illustrated, a tab stop is located. Data is then again entered into the refresh buffer. The above results in the entering of spaces following a tab command and this is precisely what would occur mechanically in a printer. It will be noted, though, that the data flow from the DSR 8 does not contain any spaces and thus is not in the format which is compatible with display. It should be further noted that once the code sequence is formatted for display purposes, it, in fact, appears the same on the display screen as the same non-formatted sequence would appear if printed out.

Refer next to the overstrike sequence. As shown in FIG. 2 the codes that come out of the DSR 8 are in a sequence of data followed by backspace codes to position the printer over the character to be overstruck and then additional data codes are then applied to the format control 13. Thus, as shown in FIG. 2, this will result in a format in which there are three X's followed by three Y's a space and a Z which is the result desired. Again as indicated by a comparison of the overstrike portions of FIGS. 2 and 3, the data code from the DSR and the resultant or required format are quite different.

Finally refer to the underscore sequence shown in FIGS. 2 and 3. In FIG. 2 it can be seen that there are two X's followed by three underscored X's a space and two Y's. The code sequence that caused this is shown in FIG. 3 and again it can be seen that there are five X's, three backspaces to position the printer under the third X followed by three underscore codes, a space code and Y characters. The above descriptions are given to facilitate an understanding of the data codes coming from the intermediate DSR which are required to cause an associated printer to accomplish the required task and to further demonstrate the difference between the format required in the buffer 16 and the data codes.

Figure 4A:
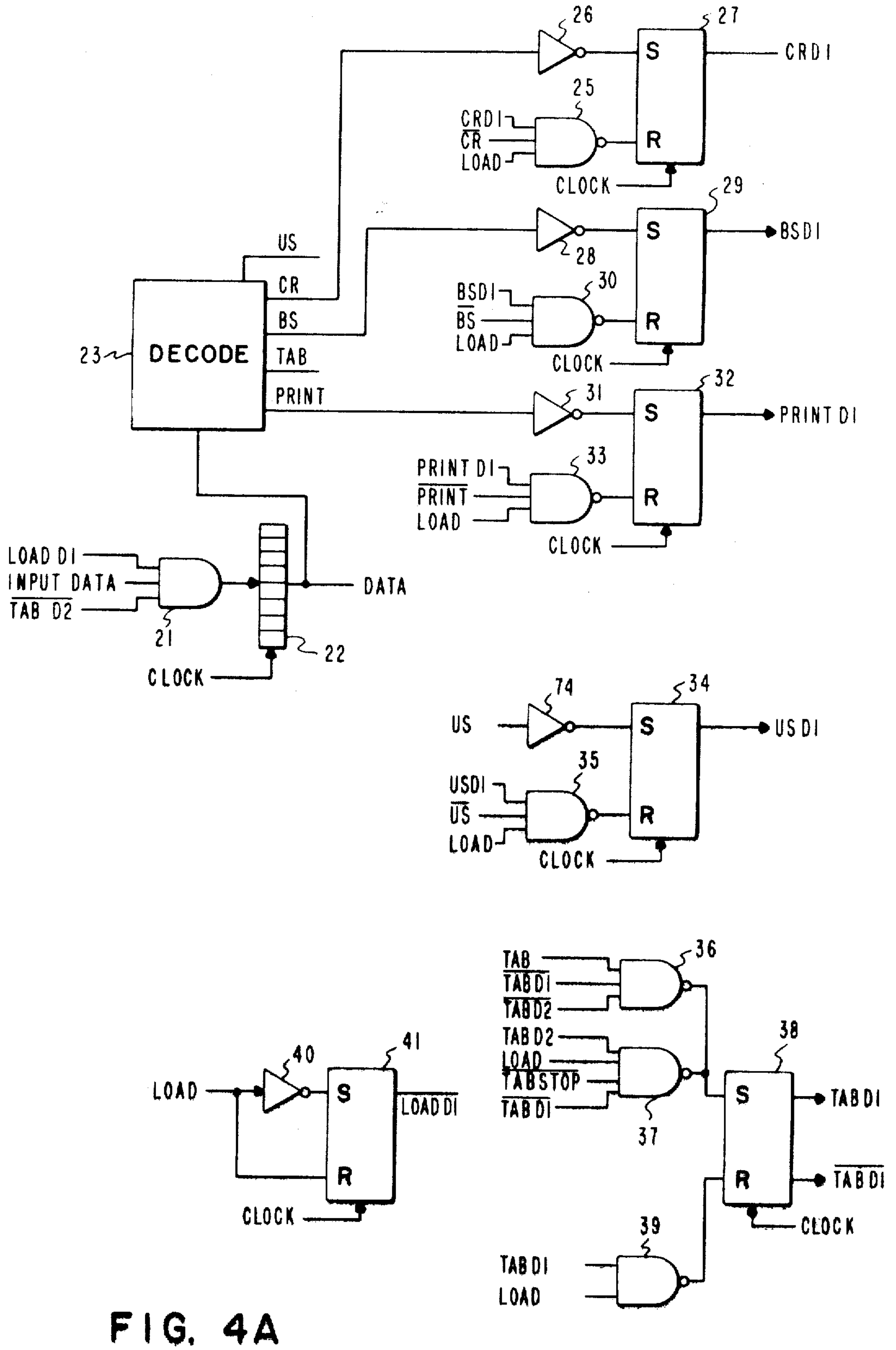
FIGS. 4*a* and 4*b* are a detailed combinational logic diagram of the format control of FIG. 1.
Figure 4B:
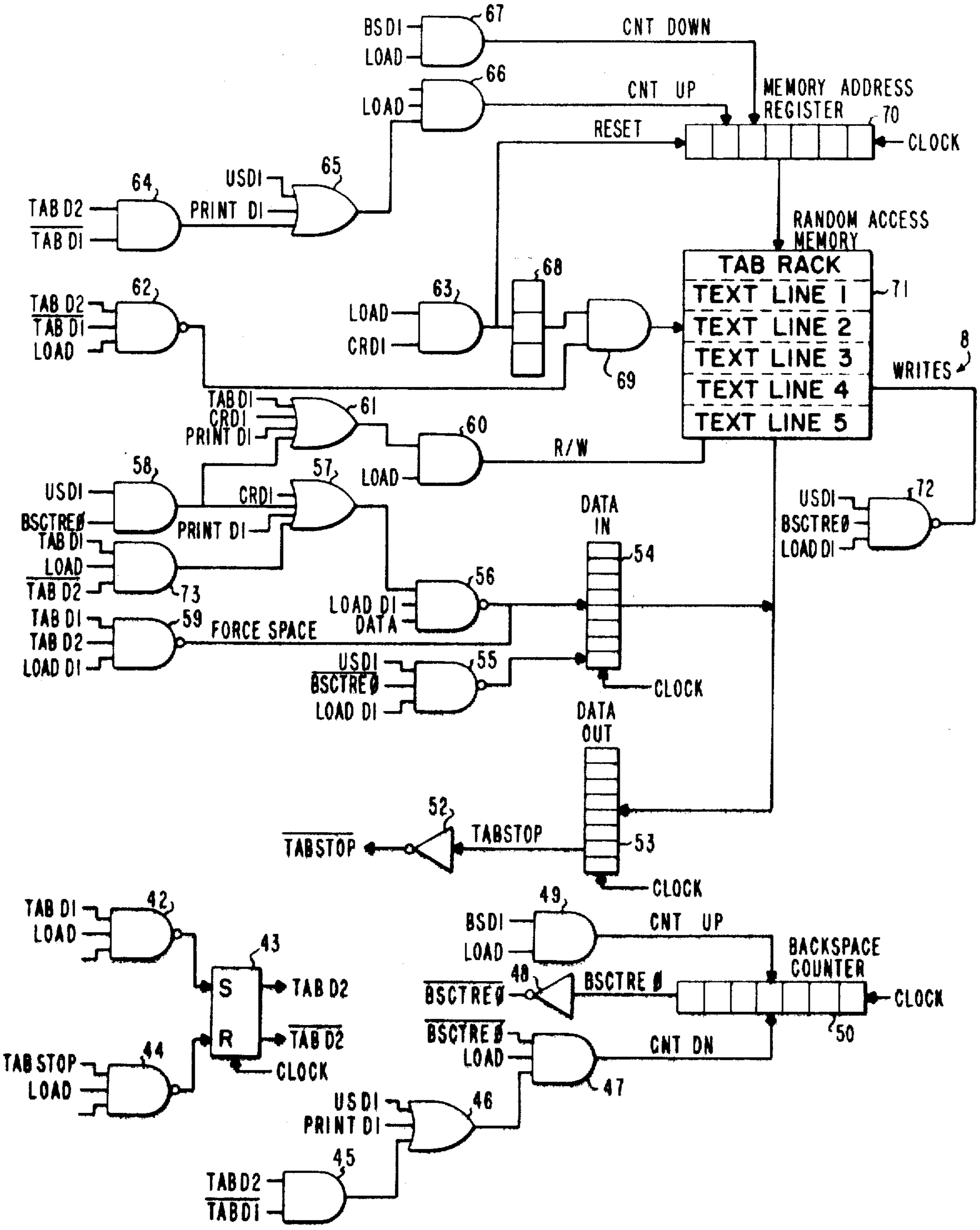
Figure 5:
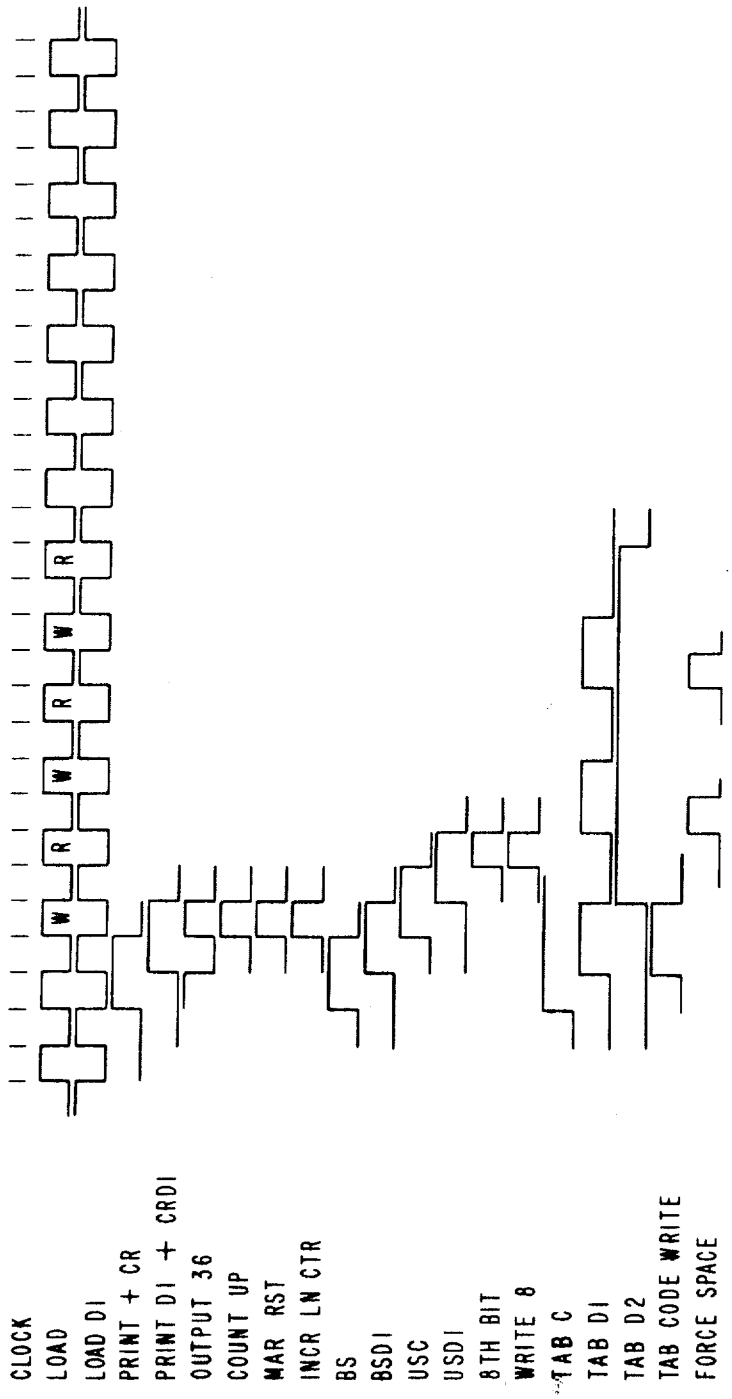
FIG. 5 is a timing diagram illustrating the timing of the various operations which take place during formatting utilizing the system of FIGS. 4*a* and 4*b*.

For a more detailed description refer next to FIGS. 4*a*, 4*b* and 5. In FIG. 5 is shown the basic timing illustrating the clock process and the two basic signals which are load and load delay 1. The other wave forms in FIG. 5 are presented in the order in which the operations in connection with FIG. 4*a* and 4*b* will be described. With respect to the load operation which is a common signal to the For a more detailed description refer next fo FIGS. 4*a*, 4*b* and 5. In FIG. 5 is shown the basic timing diagram illustrating among others the clock, and the two basic signals which are load and load delay 1. The other wave froms in FIG. 5 are presented in the order in which the operations in connection with FIG. 4*a* and 4*b* will be described. With respect to the load operation which is a common signal to the combinational logic of FIGS. 4a and 4b, it will be noted that the alternate blocks are labeled write (W) and read (R). Normally, during alternate clock cycles, the memory is usually written into on one clock cycle and during the next clock cycle is read out of for display purposes. The labeling of the blocks is however here not to illustrate this point. Instead, as will be described in detail during the description of a tabbing operation, it is to illustrate that the control logic, when the load signal is up can either cause the memory to be written into or read from. However, when load is down the memory is always read for display.

As will be further noted the load signal and the load delay 1 signal are square wave pulse trains. The load signal is generated externally and is applied to inverter

40 to the set gate of self-gated trigger 41 in a conventional manner to produce load delay 1. When the load signal falls, the reset gate of trigger 41 is conditioned and the load delay 1 trigger resets. In the present system characters can be gated in on load delay 1's or the rise time of every load since they are the same. Data from the intermediate DSR is applied to AND gate 21 as indicated on the input data line. Further, as shown, another input to AND gate 21 is the load delay 1 signal and the $\overline{\text{tab delay 2}}$ signal which will later be discussed. The significance of the $\overline{\text{tab delay 2}}$ signal is that when a tab format is being handled no more data should be input until the tab has been processed. Thus, the $\overline{\text{tab delay 2}}$ signal allows data to pass whereas if the signal were to fall further data flow from the intermediate DSR would be inhibited. Therefore, except when executing a tab characters will be input by every load delay 1 into register 22 which is in fact an 8 bit register. For convenience in the following discussion normally only one line will be shown. However, this is symbolic in that there must actually be as many lines as there are bits in the characters. The characters loaded into register 22 are then sampled by decode 23 and are transferred out along the data buss as illustrated.

The first operation which will be described will be the inputting of a normal print character. Characters as above discussed, are applied to the decode unit 23 and there decoded and an indication that a print character has been detected causes a signal to be applied to the print line which is connected to inverter 31 which causes the self-gating trigger 32 to be set to develop the print delay 1 pulse. Trigger 32 will reset if there is not another print character immediately following due to the combination of conditions, print delay 1, $\overline{\text{print}}$, and load applied to NAND 33. Assume for purposes of illustration that only one print character is input. The print delay 1 input to OR gate 57 is brought up. The output of OR gate 57 is applied to NAND gate 56. NAND gate 56 also receives logical inputs load delay 1 and data. As above indicated there are in fact 8 gates similar to gate 56 and all of these gates receive similar inputs such that the character is gated into the memory input register 54. The character in register 54 is then written into memory during the load time. The portion of memory that it is written into is determined by the address in memory address register 70. The same pulse that shifted the character into register 54 also shifts another character into register 22 such that there is a continuous stream of characters being input to the format control logic.

At this point, to facilitate an understanding of the operation of the logic, it should be pointed out that the gates are all trigger like devices and need a down going level to set them at the next clock time. This will be apparent from a consideration of the timing diagram of FIG. 5 and in particular the wave form entitled output 36. The memory address register 70 is then counted up by application of a print delay 1 pulse through OR gate 65 at the load time which conditions AND gate 66 to provide a count up pulse to memory address register 70. This steps the address counter of the memory address register 70 to the next address so that the next character can be loaded into the next address for successive print characters. This sequence of loading characters into the input register 54 for loading into the random access memory 71 along with the incrementing of the memory address counter continues as long as print delay 1 is up.

Next the process of handling carrier returns will be described. When a carrier return code is received from the intermediate DSR an indication that a carrier is to take place is applied to inverter 26 to develop a carrier return delay 1 signal by means of self gating trigger 27. In addition, NAND gate 56 functions in a manner similar to that described during the print character description such that the character is loaded into memory input register 54 for entry into random access memory 71. However, unlike the case of handling a print character the memory address register 70 must be set back to 1 to condition the random access memory for the recording of a new line. In addition the line counter register 68 must be stepped or incremented by 1. The load and carrier return delay 1 condition AND gate 63 and cause it to both reset the memory address register and to increment the line counter register 68. The function of AND gate 69 will be discussed later but suffice it to say that it is included to facilitate addressing of the electronic tab rack stored in memory. The line count register 68 is a circular five state counter which begins counting in one state and ends up in the same state so that no resetting is necessary.

Next the handling of backspaces will be described. They are handled in much the same way as carrier returns and print characters. Again a backspace code is entered from register 22 into decode 23 and a signal indicating that a backspace code has been detected is applied to inverter 28 to set self gating trigger 29 to develop the backspace delay 1 signal. Here, the similarity between the handling of a print character and carrier return sequence ends since, with respect to the data in register 22, it must be blocked off since a backspace must not be loaded into the memory. To prevent writing of the backspace code into memory no write pulse is applied to cause the character in register 54 to be written into memory. What is necessary however, is that the memory address register must be counted down which effectively backs up the memory. This must be done once for each backspace that is read in. This effectively trashes the character and in effect the memory is addressing a character that has already been written in. This is accomplished by means of AND gate 67 which is conditioned by backspace delay 1 and load to count down the memory address register. In addition during the backspace sequence there is a backspace counter which counts the backspaces. This backspace counter 50 is counted up by application of backspace delay 1 and load to AND 49. Further as shown there is a backspace counter equal zero signal applied to inverter 48 which generates a backspace counter not being equal to zero signal. After all the backspace codes have been read in the characters from the intermediate DSR are then loaded in sequentially over the previously written characters. This will continue until the backspace counter reaches zero. The backspace counter is counted down by application of backspace counter not equal to zero pulses at each load time along with the print delay 1 applied to OR gate 46 which provides the third input to AND gate 47 to provide the count down pulses. Thus, the backspace sequence ends when the backspace counter again reaches zero. This is the case when there have been input as many forward escaping characters as there were backspace or backward escaping characters. Therefore in the case of characters written over the characters which were originally in memory the only characters which are displayed are the overstriking characters.

A special case, however, utilized in a backspace sequence is that of underscoring. In this case the characters are not being written over but are to be underscored. This is accomplished by turning on, in the particular coding utilized in the present invention, the 8th bit of the character. The interpretative logic thus interprets the 8th bit being on as a signal to underscore the character on the display. In the underscore sequence the underscored characters are input from register 22 into decode 23 and an underscore delay 1 signal is generated through inverter 74 and self gating trigger 34. If there were backspaces preceding the underscores the backspace counter is not equal to zero and therefore the read/write signal applied through AND gate 60 to the memory has been degated by AND gate 58 applying a signal through OR gate 41 to prevent writing of the data into memory. The 8th bit of each character must be turned on and this is accomplished by means of NAND gate 55 which is conditioned by underscore delay 1, and backspace counter not equal to zero at load delay 1 time. Thus during this sequence the word in memory is effectively being read and the word goes into register 53 which is of no consequence. What actually occurs is that 7 bits of the memory are being read and the 8th bit is being written into the word at this time. Thus through use of this technique two read/write cycles are not required to turn the 8th bit on. The above sequence continues as long as underscore codes are decoded unless the backspace counter goes to zero at which time the underscore codes themselves are then loaded in and handled like any other print character.

When the backspace counter equals zero NAND gate 72 ceases to cause pulses to be applied to the memory. AND gates 58 and 61 again become operational when the backspace counter equals zero and then underscores are handled just as print characters are in that they come from register 22 through NAND gate 56 into data register 54 and thence into the memory.

Next a tab sequence will be described. When a tab code is detected in decode 23 the tab line is brought up. A tab delay 1 signal is then developed by means of application of the tab signal to NAND gate 36 to set trigger 38. This trigger is reset by tab delay 1 and load applied to NAND gate 39. The tab code will be handled in the data flow sense exactly like a print character is handled. However, there is another trigger 43 which is set by tab delay 1 through NAND gate 42 to develop tab delay 2. The function of tab delay 2 as will later become apparent is to stop the next character after a tab has been detected so that the tab sequence can be completed. AND gate 73 is conditioned by tab delay 1 and $\overline{\text{tab delay 2}}$ and load to provide an input to OR gate 57 which in turn provides an input to NAND gate 56 to cause the actual tab code to be written into the data register 54. Application of tab delay 1 to OR gate 61 at load time conditions AND gate 60 to cause the tab character to be effectively written into memory. At the next load time tab delay 2 sets and as above discussed once tab delay 2 sets no new characters are input. At this point in time the position in the tab rack corresponding to the location that the last character was written into which was a tab code must be read to determine if there is a tab stop. The write line from AND gate 60 must therefore be degated since when the output of AND 60 is up writing occurs; when down reading occurs. Since OR gate 61 has tab delay 1 on it this effectively, through AND gate 60, degates the line. During the next cycle a word is read from memory. At the same time with tab delay 2, $\overline{\text{tab delay 1}}$, and load input to NAND gate 62, the line counter 68 is degated and its output is zero. A zero address as far as the line counter is concerned implies a tab rack so that the next data which will be output to register 53 will be the contents of the tab rack or the content of the tab rack for that particular character location. If there is no tab stop, tab delay 2 will stay up and tab delay 1 will come back up being set through NAND gate 37 which has inputs tab delay 2, load, $\overline{\text{tab stop}}$, and $\overline{\text{tab delay 1}}$. Then the write line is brought back up because tab delay 1 is up through OR gate 61 and AND gate 60. The "force space" line dot ors in at the output of AND gate 56. This line is brought up through NAND gate 59 being conditioned by tab delay 1, tab delay 2 and load delay 1. Further with tab delay 2 and $\overline{\text{tab delay 1}}$ applied to AND gate 64 OR gate 65 will be conditioned to cause the memory address register 70 to be counted up through AND gate 66 such that a space is input into the next address position in the random access memory. This sequence continues until a tab stop is located. When a tab stop is detected in register 53 a $\overline{\text{tab stop}}$ signal is generated by means of inverter 52. This is due to the fact that the set on tab delay 1 has a $\overline{\text{tab stop}}$ and it will not come back since there is a $\overline{\text{tab stop}}$ signal applied to NAND gate 37. Tab delay 1 is then not set again due to the tab stop being detected and trigger 43 is reset which is tab delay 2. Effectively then, in memory, escapement has been accomplished down to the tab stop.

While the invention has been shown and described with reference to a particular embodiment, it will be understood by those skilled in the art that various changes in form and detail may be made without departing from the spirit and scope of the invention.

What is claimed is:

1. A formatting system for formatting textual data on a display in the same format as the textual data would appear upon printout on a printer, said system comprising:

first means for storing codes representative of said textual data and format control codes, means for entering said codes into said first storage means, means operatively connected to said first storage means and responsive to said codes for completely formatting said textual data under control of said control codes a second storage means operatively connected to said means for formatting for storing said completely formatted textual data said second storage means having an electronic tab rack having operator set tab positions, said means for formatting further including means responsive to said second storage means for controlling tab operations operative upon the detection of a tab control code, said means for controlling including means for terminating the transmission of codes representative of textual data to said means for formatting and means responsive to said means for terminating for entering spaces sequentially into said second storage means until one of said tab positions in said electronic tab rack is detected; and means for displaying said completely formatted textual data operatively connected to said second storage means.

2. The formatting system of claim 1 further wherein said second storage means is a random access memory and said system further includes means for addressing said memory, said means for addressing said memory including both a memory line register for addressing a line of textual data and a memory address register means for addressing a character within a line in said memory.

3. The formatting system of claim 2 further wherein said means for entering said codes is a keyboard.

4. The formatting system of claim 5 further wherein said means for formatting includes means for controlling backspacing operations including a backspace counter, means for incrementing said backspace counter by one count for each backspace code, means for decrementing said memory address register by one for each of said backspace codes; second means for decrementing including means for decrementing said backspace counter by one count following the receipt of a backspace code for each forward escaping code and second means for incrementing said memory address register by one count for each of said forward escaping codes.

5. The formatting system of claim 4 further including means for controlling underscoring including means for incrementing by one count said backspace counter for each backspace code and means for decrementing said memory address register by one count for each of said backspace codes; means for reading from said memory the character in the memory location addressed by said memory registers and means for selectively setting in said characters an underscore bit upon the detection of an underscore code; means for returning each of said characters immediately to their previous memory locations; second incrementing means for incrementing said memory address register following said return, and means for repeating the above sequence for each of said underscore codes.

* * * * *

PO-1050
(5/69)

UNITED STATES PATENT OFFICE
CERTIFICATE OF CORRECTION

Patent No. 3,744,033 Dated July 3, 1973

Inventor(s) William Weller Boyd

It is certified that error appears in the above-identified patent and that said Letters Patent are hereby corrected as shown below:

Column 9, line 16, "5" should read --3--.

Signed and sealed this 27th day of November 1973.

(SEAL)
Attest:

EDWARD M.FLETCHER,JR.
Attesting Officer

RENE D, TEGTMEYER
Acting Commissioner of Patents